(12) United States Patent
Williams

(10) Patent No.: US 7,591,192 B2
(45) Date of Patent: Sep. 22, 2009

(54) PIPE COUPLING INCLUDING AN ORIFICE PLATE AND A RATE OF FLOW MEASURING DEVICE

(76) Inventor: David Williams, 1 Meadowside, Croston, Leyland, Lancashire PR29 9QY (GB)

( * ) Notice: Subject to any disclaimer, the term of this patent is extended or adjusted under 35 U.S.C. 154(b) by 405 days.

(21) Appl. No.: 10/522,489

(22) PCT Filed: Jul. 24, 2003

(86) PCT No.: PCT/GB03/03262

§ 371 (c)(1),
(2), (4) Date: Sep. 15, 2005

(87) PCT Pub. No.: WO2004/011841

PCT Pub. Date: Feb. 5, 2004

(65) Prior Publication Data
US 2006/0096641 A1    May 11, 2006

(30) Foreign Application Priority Data
Jul. 30, 2002 (GB) ............................. 0217581.8

(51) Int. Cl.
*G01F 1/37* (2006.01)
*F16K 11/20* (2006.01)
(52) U.S. Cl. .................... 73/861.52; 137/597
(58) Field of Classification Search .......... 73/861.52, 73/861.63
See application file for complete search history.

(56) References Cited

U.S. PATENT DOCUMENTS

| | | | | |
|---|---|---|---|---|
| 2,648,232 A | * | 8/1953 | Randol | 477/77 |
| 3,449,954 A | * | 6/1969 | Brown | 73/861.65 |
| 3,600,945 A | * | 8/1971 | Wenzel et al. | 73/861.52 |
| 3,626,755 A | * | 12/1971 | Rudolph | 73/861.52 |
| 3,657,878 A | * | 4/1972 | Kaufmann, Jr. | 60/308 |
| 3,831,630 A | * | 8/1974 | McGavin | 137/597 |
| 4,380,977 A | * | 4/1983 | Holstein | 123/198 F |
| 4,672,728 A | * | 6/1987 | Nimberger | 29/890.142 |
| 4,738,276 A | * | 4/1988 | Adams | 137/343 |
| 4,745,810 A | * | 5/1988 | Pierce et al. | 73/706 |
| 4,865,360 A | * | 9/1989 | Adams | 285/142.1 |
| 4,879,912 A | * | 11/1989 | Suckow | 73/861.61 |
| 5,117,867 A | * | 6/1992 | Adams | 137/577 |
| RE34,610 E | * | 5/1994 | Miller et al. | 137/597 |
| 5,449,294 A | * | 9/1995 | Rench et al. | 137/1 |
| 5,588,467 A | | 12/1996 | Crane | |
| 5,646,352 A | * | 7/1997 | Joseph et al. | 73/756 |
| 5,709,247 A | * | 1/1998 | Hutton | 137/884 |

(Continued)

FOREIGN PATENT DOCUMENTS

GB      2311101 A    9/1997

*Primary Examiner*—Harshad Patel
(74) *Attorney, Agent, or Firm*—Wood, Phillips, Katz, Clark & Mortimer

(57) ABSTRACT

A pipe coupling flange (16) comprising a central bore and having first and second ports for receiving valves and a plurality of channels, wherein a take-off channel links the first port with the central bore, a feed channel links the first port directly or indirectly with the second port; and wherein the second port links directly or indirectly with the exterior of the flange. Across two pipe flanges (16), an fixed directly to the periphery of each flange there may be a Bridge (30). The bridge (30) may be capable of having process media (24) monitoring devices fixed directly to it.

26 Claims, 4 Drawing Sheets

U.S. PATENT DOCUMENTS

| | | | | |
|---|---|---|---|---|
| 5,720,317 A * | 2/1998 | Nimberger | | 137/597 |
| 5,725,024 A * | 3/1998 | Nimberger | | 137/597 |
| 5,823,228 A * | 10/1998 | Chou | | 137/597 |
| 5,832,956 A * | 11/1998 | Nimberger | | 137/597 |
| 5,861,546 A * | 1/1999 | Sagi et al. | | 73/40.5 R |
| 5,868,155 A * | 2/1999 | Hutton | | 137/240 |
| 6,035,724 A * | 3/2000 | Hewson | | 73/756 |
| 6,101,885 A * | 8/2000 | Touzin et al. | | 73/861.22 |
| 6,112,767 A * | 9/2000 | Pinkham | | 137/597 |
| 6,176,262 B1 * | 1/2001 | Nimberger | | 137/597 |
| 6,394,138 B1 * | 5/2002 | Vu et al. | | 137/884 |
| 6,543,297 B1 * | 4/2003 | Kleven | | 73/861.52 |
| 6,622,573 B2 * | 9/2003 | Kleven | | 73/861.42 |
| 6,651,514 B2 * | 11/2003 | Zanker | | 73/861.52 |
| 6,672,173 B2 * | 1/2004 | Bell | | 73/861.52 |
| 6,915,705 B1 * | 7/2005 | Truitt et al. | | 73/861.52 |
| 6,928,884 B1 * | 8/2005 | Pearson | | 73/861.42 |
| 6,938,708 B2 * | 9/2005 | Bloom et al. | | 175/51 |
| 7,174,974 B2 * | 2/2007 | Bloom et al. | | 175/51 |
| 7,284,450 B2 * | 10/2007 | Orleskie et al. | | 73/861.52 |
| 2006/0056597 A1 * | 3/2006 | Inneman et al. | | 378/145 |
| 2007/0267352 A1 * | 11/2007 | Gordon | | 210/723 |

* cited by examiner

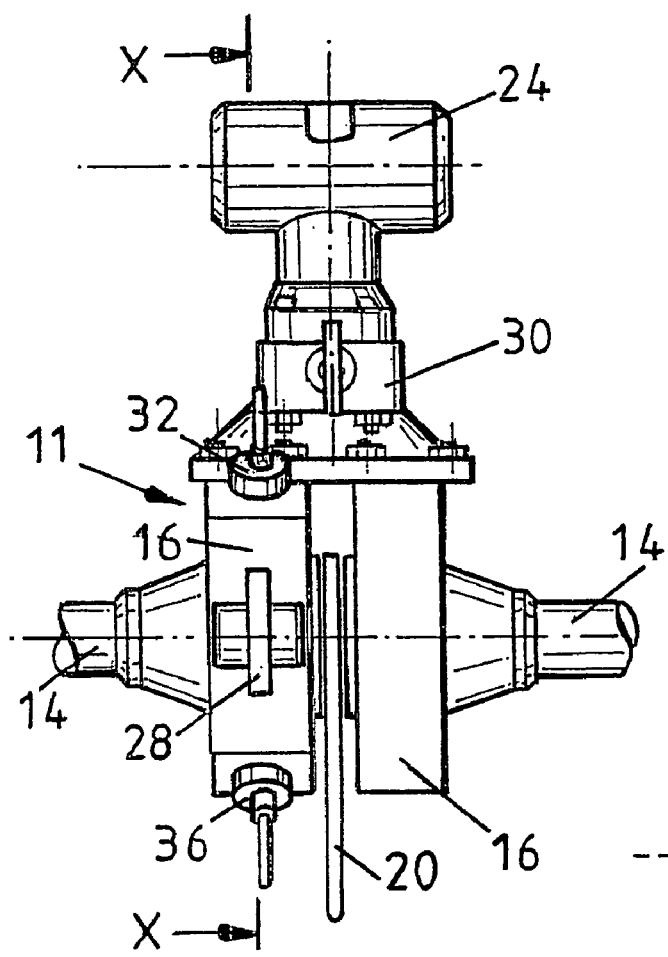
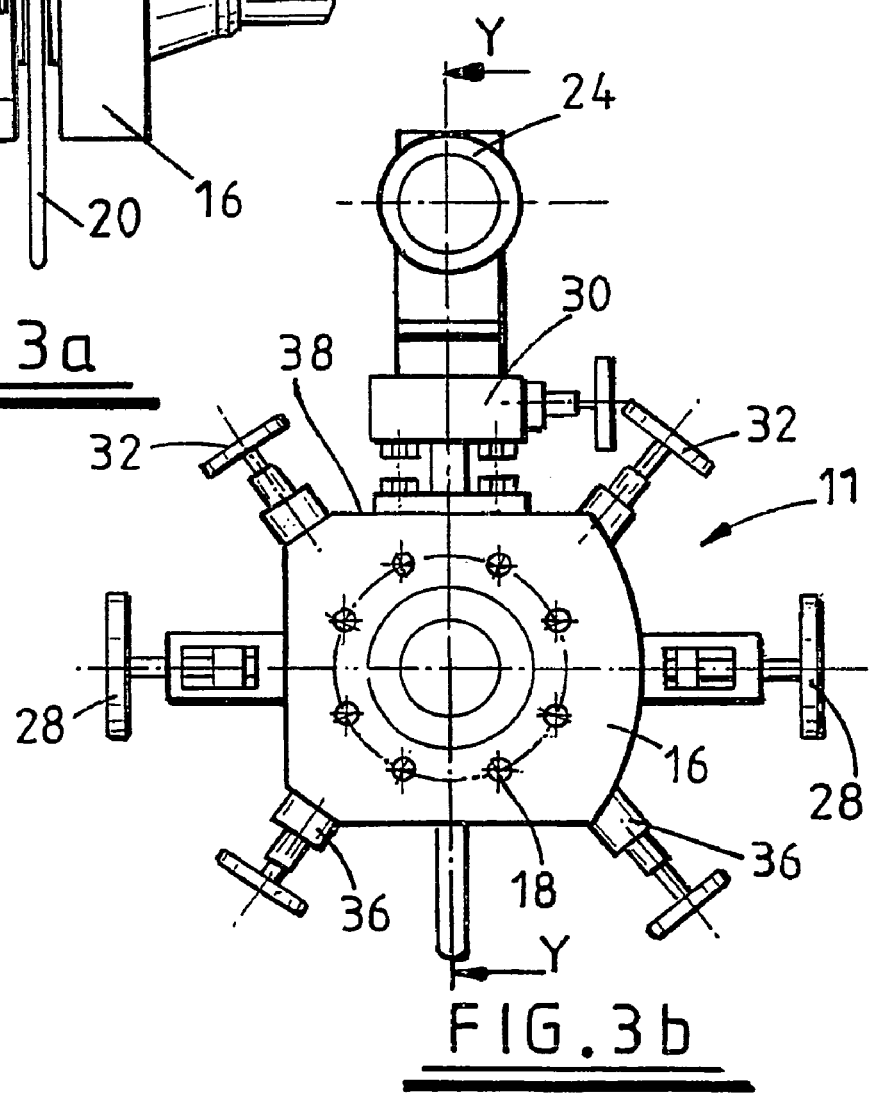

PIPE COUPLING INCLUDING AN ORIFICE PLATE AND A RATE OF FLOW MEASURING DEVICE

The present invention relates to pipe couplings and in particular to flanged-pipe couplings of the type, which comprise a bolted pipe joints.

Flanged pipe couplings are commonplace on manufacturing plant (e.g. chemical plant) since they provide a relatively simple way of securing sections of process pipe work to one another.

The monitoring of process conditions inside a process pipe can be of paramount importance in controlling the manufacturing and or distribution process. Accordingly, transducers can be fitted to process pipe work to enable test and measurement of the fluid to take place in-situ.

A common measurement transducer is the differential pressure (or "ΔP") transducer, which is used for measuring pressure differentials that can relate to a number of fluid properties including viscosity and flow rate.

Current methods of process pipe media monitoring for Differential Pressure Flow Measurement (DPFM) involve:

1) Hanging all necessary valves and/or manifolds and process media monitoring devices from two screwed or welded fittings, which are fixed to the periphery of traditional flanges known as "orifice flanges". These flanges are bolted together about a traditional orifice plate and gaskets from which a differential pressure is created.

2) Using tube or pipes (commonly referred to as Impulse Lines) to connect the two screwed or welded fittings to the valve and/or manifold assemblies which are located some distance away from the orifice flanges and pipe work.

3) Cutting into the main process pipe and manufacturing traditional "Flanged Pipe Tee's". From the leg of the pipe tee, flanged valves or manifolds are connected while process media monitoring devices are connected using tube and fittings or further flanged joints.

A typical prior art DPFM assembly incorporating a ΔP transducer is shown in FIG. 2 of the accompanying drawings, whereby a sample of the fluid in the process pipe is taken at either side of a partial obstruction, in this case, an orifice plate located between the process pipe flanges. The transducer is protected by a "double block and bleed" (DBB) valve assembly, which is primarily a safety device, but which has other uses in servicing of the flanged joint, transducer and associated pipe work.

Disadvantages of prior art DPFM assemblies include:

1) Excessive weight on the two screwed or welded fittings in the Orifice Flanges. These joints may be subject to failure due to bending moments, vibration and or corrosion.

2) Space-inefficiency

3) A typical DPFM assembly comprises a large number of pipes, nipples, fittings and valves, all of which need to be sealed. Moreover, because differential pressure measurements are highly complex and require a number of joints to build up an assembly, the risk of process leakage to atmosphere is increased. If there is a leak in any of the seals, then process fluids may escape to atmosphere, which is potentially hazardous to persons nearby, harmful to the environment and wasteful.

4) Because there are a number of exposed pipes and fittings, the assembly is susceptible to being knocked and damaged. Moreover, engineers or operators when working or maintaining the plant sometimes use the take-off pipes as "steps". Because the assembly is largely unsupported, except by the nipples where the first take-off pipe emerges from the flange, it is highly susceptible to bending and/or shear loading, for which it was not designed.

5) The failure of any of the joints, especially the joint between the process pipe and the first block valve, can be catastrophic, for example, where the process media is a boiling acid.

6) The pipes, fittings, valves and transducer are mounted away from the process pipe, which creates a "dead leg", that is to say, a volume of fluid between the process pipe and the transducer that is stagnant. This introduces a number of problems for example; bleeding the DBB assembly wastes unnecessarily large quantities of process fluid; the fluid conditions, for example, the temperature, at the transducer may not be the same as those in the process pipe itself, and the take-off pipes and fittings may become contaminated. Furthermore, the accuracy of readings taken from such installations may be reduced due to length of "Impulse lines" and the quality of workmanship.

7) The DPFM assembly needs to be assembled and installed on-site because it is not possible to ship it prefabricated, being a bespoke item.

8) The installation of an assembly is costly and time consuming owing to:

a) The complexity of the set-up, the number of parts involved and the need for specialist engineers to install and test the assembly.

b) The complex build up of additional support work along with the valve and/or manifold assemblies;

c) The labour intensive assembling process required to install the additional tube and/or pipe work and fittings, along with the valve/manifold and process media monitoring device; and d) The fabrication process required making up the "Flange Tee's" and subsequent interconnecting feeds.

It is therefore an object of the present invention to propose a solution to one or more of the above problems. In particular, it is an object of the invention to provide a pipe coupling assembly which is a safer, more reliable and more cost efficient method of fixing process media monitoring devices to process pipe work.

Accordingly, a first aspect of the invention provides a pipe coupling flange comprising a central bore and having first and second ports for receiving valves and a plurality of channels, wherein a take-off channel links the first port with the central bore, a feed channel links the first port directly or indirectly with the second port; and wherein the second port links directly or indirectly with the exterior of the flange.

The pipe coupling flange of the invention may additionally comprise a third port connected directly or indirectly with the first port via one or more feed channels.

The above-mentioned indirect connections may comprise one or more channels found in the pipe flange.

The third port may be adapted to receive an in-line valve, which may be attached to a vent pipe.

Alternatively, the pipe coupling flange may be provided with a fourth port adapted to receive a pipe joint and a feed channel connecting the third port with the fourth port.

In a preferred embodiment of the invention, the ports of the pipe coupling flange are adapted to receive rising stem valves. Alternatively, however, the ports may be adapted to receive in-line valves.

The invention is preferably adapted to receive a transducer, which is connected directly or indirectly, to a port of the pipe coupling flange. The transducer may be connected directly to the pipe coupling flange or it may be connected indirectly, by way of a bridge element.

Additionally, the bridge may comprise one or more ports and channels for receiving valves or blanks.

The bridge may be manufactured of any suitable material, although it is envisaged that a metal would be most preferable. The bridge may be fabricated such that it is adapted to receive industry standard transducers. Accordingly, an industry standard footprint is most preferably incorporated into the design of the bridge.

The flange of the pipe coupling preferably has one or more through apertures to enable adjacent flanges to be connected to one another. Most preferably, the through apertures are adapted to receive bolts.

The flanges may be manufactured of any suitable material, although metal, and in particular steels and stainless steels, may be appropriate in certain circumstances.

The flanges may be formed integrally with a process pipe or may comprise collar elements. Where collar elements are provided on the flanges, they are preferably adapted to slidably engage with a process pipe. Where the flanges comprise collar elements, the collar elements are preferably adapted for welded connection to the end of a process pipe.

The pipe coupling flange of the invention may be used to provide a block and bleed outlet on a process pipe. Where a third port is provided, the pipe coupling flange of the invention may provide a double block and bleed outlet on the process pipe. It is envisaged that two pipe coupling flanges according to the invention will be used together to provide DPFM assembly integrally with the process pipe.

Where two pipe coupling flanges according to the invention are used to provide a DPFM assembly, an orifice plate is preferably positioned between them to create a partial obstruction in the process pipe.

A transducer is preferably fitted across the DPFM assembly, which is formed using a pair of pipe couplings according to the invention. The transducer is preferably affixed to the DPFM assembly by way of a bridge or interface block. The bridge preferably has one or more channels therein that connect the outlet channels of the pipe coupling with the inlet ports of the transducer.

The transducer, where provided, may be a pressure sensor or a differential pressure sensor. All joints and/or interfaces are preferably sealed using gaskets.

According to a second aspect of the present invention there is provided a pipe coupling comprising of two bolted pipe flanges, rising stem type valves, an interconnecting "Bridge", an orifice plate and pipe gaskets or rings. Thus allowing the installation of process media monitoring devices directly on to the process pipe work.

The pipe flanges may incorporate valves of the rising stem type. An interconnecting bridge is preferably fixed directly to the periphery of the flanges, which may provide independent process pipe media feeds from each of the two flanges. The bridge may also facilitate the direct fixing of process media monitoring devices.

The pipe coupling assembly is preferably manufactured of metal along with suitable gasket materials (for example, metal, graphite or compressed fibres) for a traditional pipe flange joint build up. In a most preferred embodiment of the invention, the coupling assembly is compliant with any necessary design codes for valves, manifolds, flanges and pipe work.

It is envisaged that the pipe couplings of the invention may be supplied in kit form. The kits may comprise one or more pipe couplings, one or more orifice plates and optionally a transducer. The transducer supplied with the kit may be a differential pressure sensor.

Where the invention is provided in kit form, it is preferably pre-assembled and pressure tested.

A preferred embodiment of the invention shall now be described, by way of example only, with reference to the accompanying drawings in which;

FIG. 3a shows a side elevation of a coupling according to the invention;

FIG. 3b shows an end elevation of a pipe coupling according to the invention;

Figure 1:
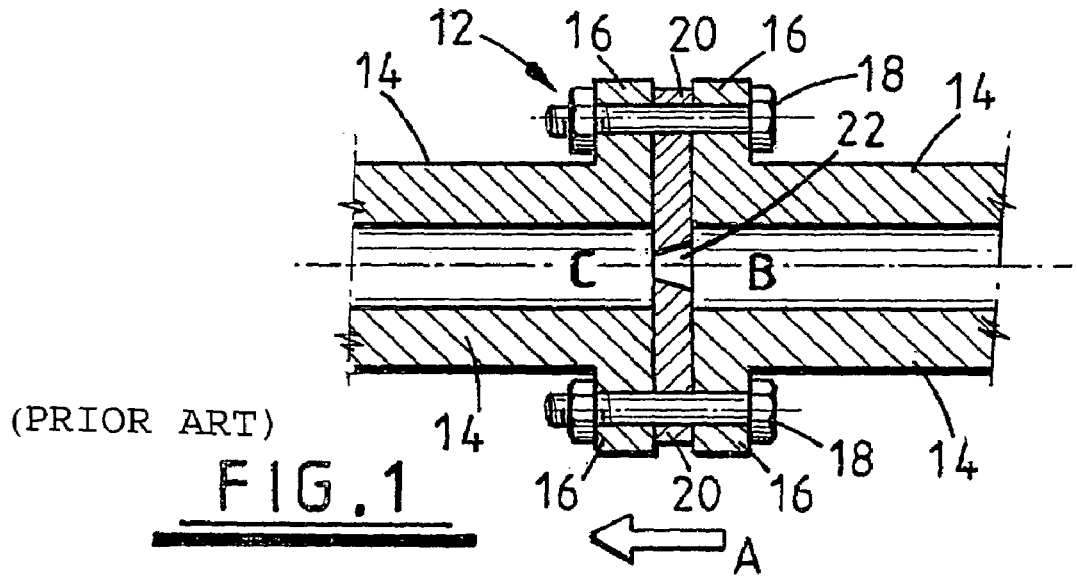
FIG. 1 shows cross-section through a flanged pipe coupling.

Referring to FIG. 1 of the drawings, a bolted pipe joint 12 is shown in which, a pair of adjacent pipes 14 are secured to one another by way of bolts 18 that pass through apertures in flanges 16 located at the ends of the pipes. There is an apertured orifice plate 20 clamped between the flanges 16. The aperture 22 in the orifice plate 20 is tapered in the flow direction of fluid in the pipe 14, as indicated by arrow A. As fluid flows through the pipe 14, it is restricted by the orifice plate 20. Accordingly, there is a region B of increased fluid pressure upstream of the orifice plate 20 and conversely, a region C of reduced fluid pressure downstream of the orifice plate 20.

A pressure differential "ΔP" transducer can be fitted across the orifice plate 20 to compare the fluid pressure upstream and downstream of the orifice plate 20 to determine the flow characteristics of the fluid.

Figure 2:
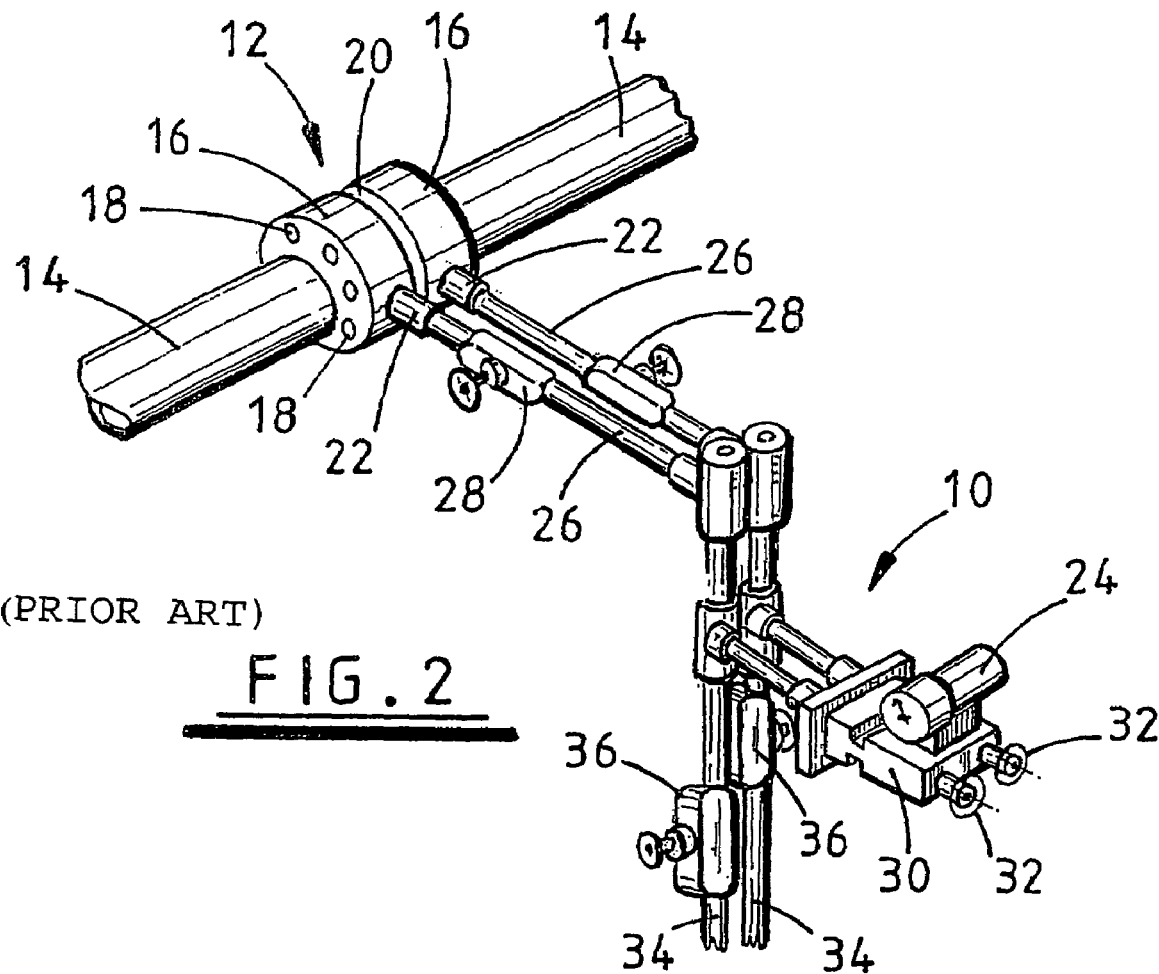
FIG. 2 shows a perspective view of a prior art differential pressure gauge arrangement fixed across a flanged pipe coupling.

FIG. 2 of the drawings shows a prior art method of affixing a ΔP transducer assembly 10 across an orifice plate 20 in which, a pair of adjacent process pipes 14 are jointed as detailed above.

Each of the pipe flanges 16 have been drilled and tapped to receive a screw-threaded or welded nipple 22. The ΔP gauge assembly 10 is protected by a "double block and bleed" valve assembly, enabling on the one hand, the transducer 24 to be selectively isolated from the process pipe 14, and on the other, the connecting pipe work to be "bled" as and when required.

Accordingly, the take-off pipes 26 are fitted with a "primary block" valve 28, which isolates the assembly 10 from the process pipes 14. The take-off pipes 26 then lead towards an interface block 30, which has a "secondary block" valve 32 incorporated therewith. There is also present, located between the primary 28 and secondary 32 block valves, a vent pipe 34, incorporating a "vent" valve 36.

With the primary 28 and secondary 32 block valves open and the vent valve 36 closed, the transducer 24 is able to sample the pressure in the process pipe 14 at either side of the orifice plate 20. After use, the primary 28 and secondary 32 block valves can be closed, and the vent valve 36 opened to drain the take-off pipes 26.

Furthermore, with the secondary block valve 32 closed, the transducer 24 may be removed for servicing, cleaning or replacement.

Turning now to FIGS. 3a and 3b, the pipe coupling 11 comprises of two bolted pipe flanges 16 with an interconnecting bridge 30 fixed directly to the periphery of the two flanges 16. The two flanges 16 can be bolted 18 together about a traditional orifice plate 20 and flange gaskets. The Bridge 30 facilitates the direct fixing of process media monitoring devices 24 and may incorporate additional ports and/or valves.

The Bridge 30 also allows the two independent process media feeds to be directed to the process media monitoring device 24. The Bridge 30 allows to opposing lateral movement of the flanges 16 when the orifice plate 20 requires replacing. The two flanges 16 can be separated without the need to disassemble the complete coupling 11.

As shown in FIG. 3*b* rising stem valves 28, 32 and 36 are also fixed to the periphery of each of the pipe flanges 16. These valves can be arranged to provide the process media control functions required. The Bridge 30 can also facilitate additional rising stem valves and/or ports if required.

In FIGS. 3*a* and 3*b*, a ΔP transducer assembly 10 according to the invention is shown whereby the "double block and bleed" valve assembly is formed integrally with the process pipe flanges 16. The ΔP transducer 24 is connected to an interface block 30, which bolts directly to a machined "flat" 38 on the flange 16 of the process pipe 14. Each flange 16 comprises a primary 28, secondary 32 and bleed 36 valve in addition to means for the attachment of a vent pipe 34 (not shown). The operation of the assembly 10 is the same as for a conventional assembly, that is to say; opening the primary 28 and secondary 32 block valves and closing the vent valve 36 for normal operation; or closing the primary 28 whilst opening the secondary 32 block valve and vent valve 36 to bleed the assembly 10.

Figure 4:
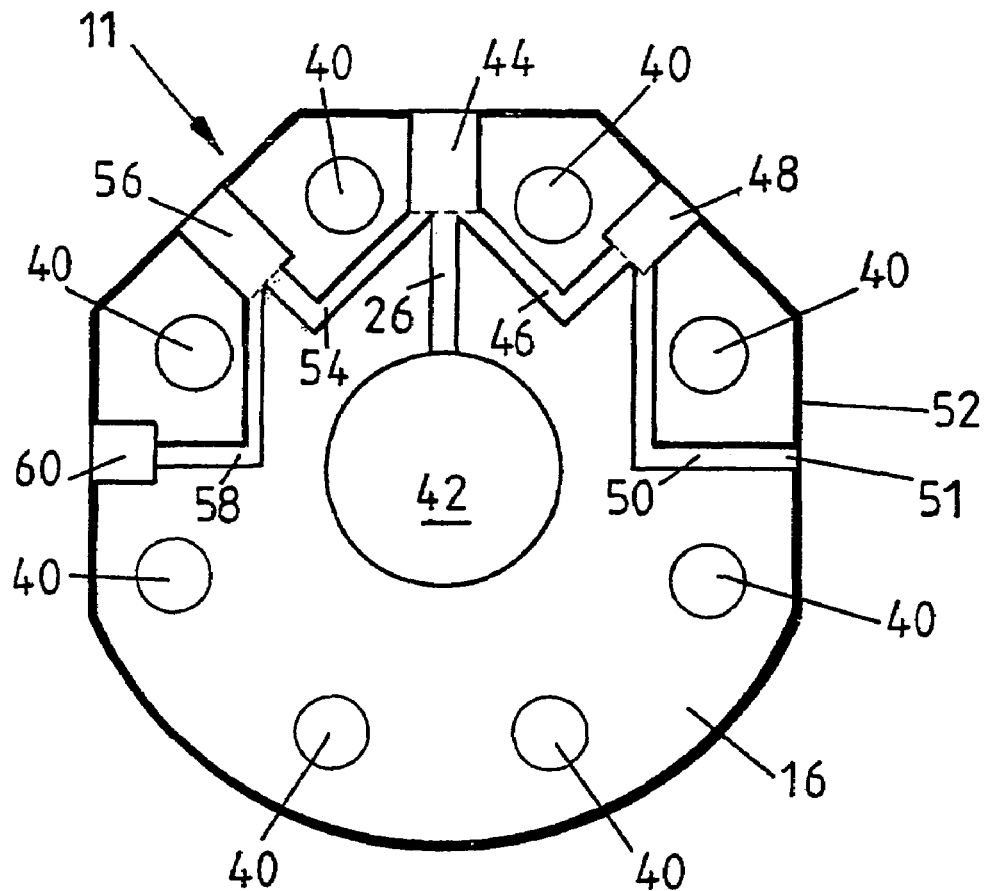
FIG. 4 shows a cross-section of FIG. 3a on X-X.

FIG. 4 shows a section of flange 16 of the invention. The flange 16 has a central bore 42, through which the process fluid flows and bolt apertures 40 for connecting adjacent flanges 16 to one another.

The take-off channel 26 leads to a primary block valve seat 44, which is adapted to receive a rising stem valve (not shown for clarity) for isolating the process fluid from the transducer (not shown). A first feed channel 46 leads from the primary block valve seat 44 to a secondary block valve seat 48, which is adapted to receive a rising stem valve. A second feed channel 50 leads from the secondary block valve seat 48 to a port 51. The bridge and transducer (not shown) are fitted directly to the machined flat face 52 of the flange 16.

A third feed channel 54 leads from the primary block valve seat 44 to the vent valve seat 56, which is, adapted to receive a rising stem valve (not shown). Finally, a fourth feed channel 58 leads from the vent valve seat 56 to a bleed pipe nipple seat 60, which is used for connecting a bleed pipe (not shown) to the assembly 10.

Figure 5:
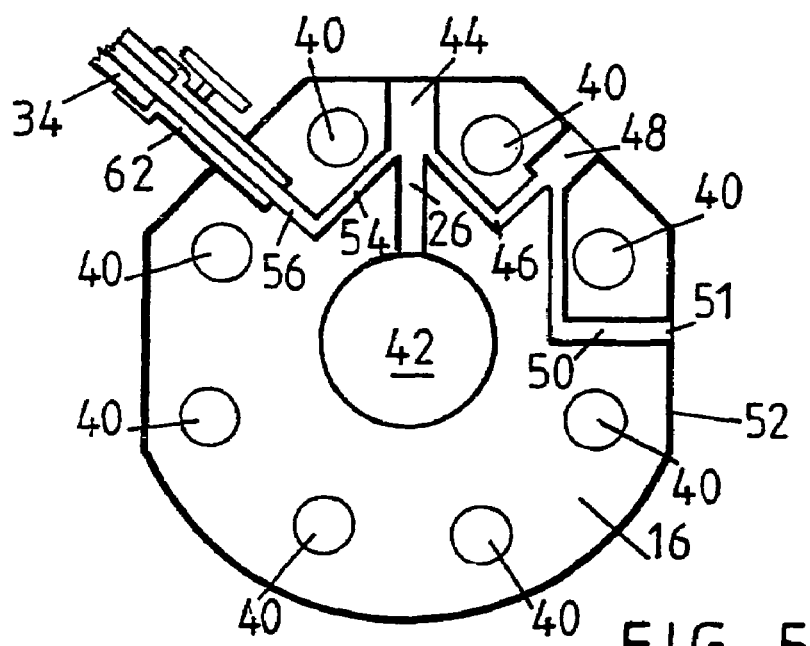
FIG. 5 shows an alternative cross-section of FIG. 3a on X-X.

FIG. 5 shows an alternative embodiment of the invention whereby the fourth feed channel 58 and bleed pipe nipple seat 60 are replaced by an in-line bleed valve and pipe connector 62, to which the bleed pipe 34 is directly fitted.

Figure 6:
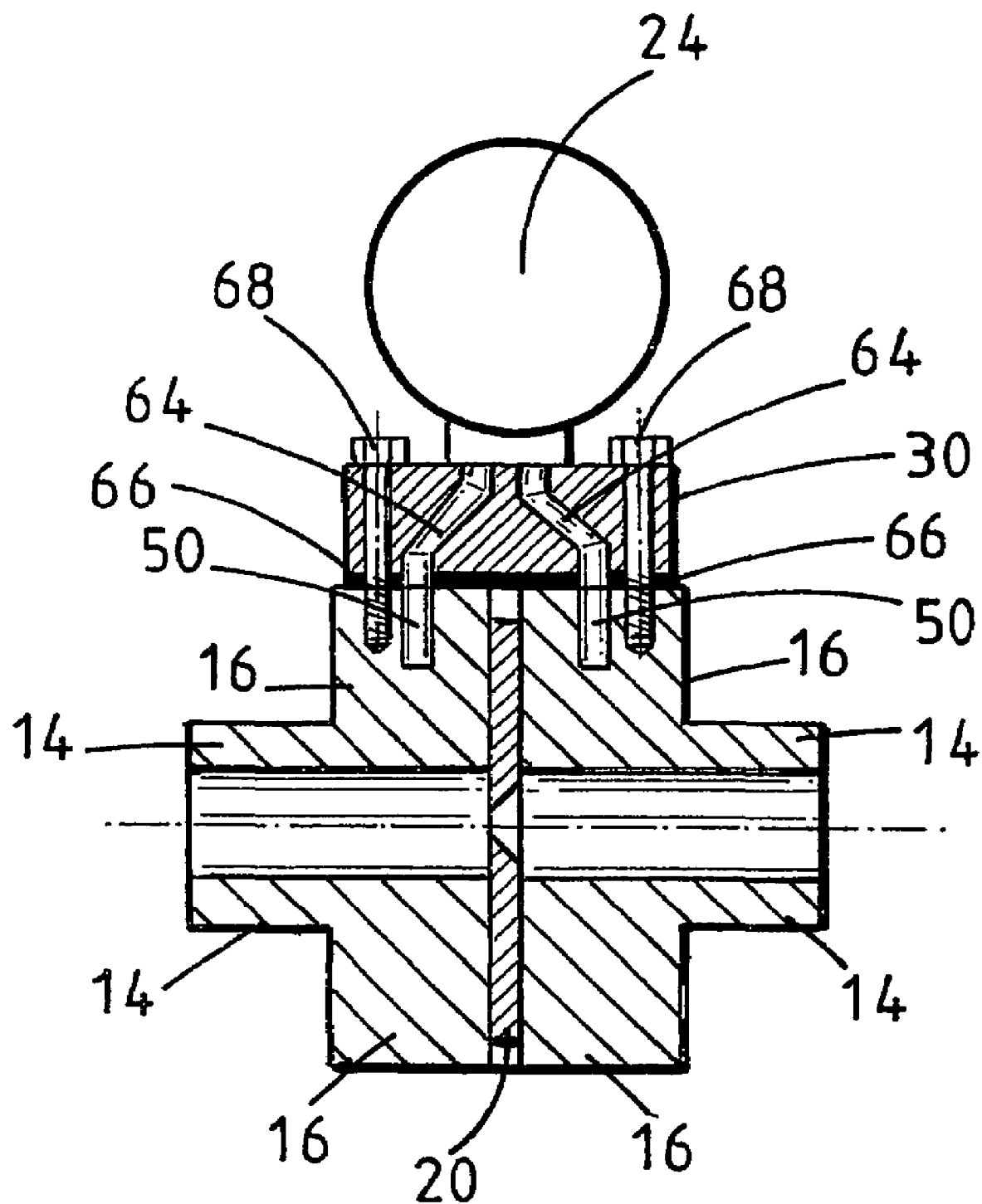
FIG. 6 shows a cross-section of FIG. 3b on Y-Y.

Finally, FIG. 6 shows a section through the pipe flanges and bridge 30. The second feed channel 50 leads into channels 64 in the bridge 30 that correspond therewith. The bridge 30 is seated on a seal or seals 66 and is affixed thereto by bolts 68. The transducer 24 is affixed to the bridge 30 using an industry standard connector (not shown).

The invention claimed is:

1. A pipe coupling flange comprising a central bore, first and second ports for receiving valves, a take-off channel for linking the first port with the central bore, a feed channel for linking the first port with the second port, wherein the second port links with the exterior of the flange.

2. A pipe coupling flange as claimed in claim 1 further comprising a third port connected directly or indirectly to the first or second port via one or more feed channels.

3. A pipe coupling as claimed in claim 1, wherein the pipe coupling is provided with a fourth port adapted to receive a pipe joint and a feed channel connecting the third port with the fourth port.

4. A pipe coupling flange as claimed in claim 1, wherein the ports of the pipe coupling are adapted to receive rising stem valves.

5. A pipe coupling as claimed in claim 1, wherein the ports are adapted to receive in-line valves.

6. A pipe coupling flange as claimed in claim 1, further comprising a transducer.

7. A pipe coupling flange as claimed in claim 6, wherein the transducer is connected to an outlet channel of the pipe coupling.

8. A pipe coupling flange as claimed in claim 6, wherein the transducer is connected directly to the pipe coupling.

9. A pipe coupling flange as claimed in claim 6, wherein the transducer is connected to the pipe coupling indirectly by way of a bridge element.

10. A pipe coupling flange as claimed in claim 9, wherein the bridge is manufactured of metal.

11. A pipe coupling flange as claimed in claim 10, wherein the bridge is manufactured of steel.

12. A pipe coupling flange as claimed in claim 9, wherein the bridge is adapted to receive industry standard transducers.

13. A pipe coupling flange as claimed in claim 9, wherein the bridge incorporates an industry standard footprint for receiving a transducer.

14. A pipe coupling flange as claimed in claim 1, when the flange is formed integrally with a process pipe.

15. A pipe coupling flange as claimed in claim 1, when the flange comprises a collar element.

16. A pipe coupling flange as claimed in claim 15, wherein the collar element is adapted to slidably engage with a process pipe.

17. A pipe coupling flange as claimed in claim 15, wherein the collar element is adapted for welded connection to a process pipe.

18. A pipe coupling assembly comprising two adjacent pipe coupling flanges as claimed in claim 1.

19. A pipe coupling assembly as claimed in claim 18, further comprising an orifice plate located between the adjacent pipe coupling flanges.

20. A pipe coupling assembly as claimed in claim 18, further comprising a bridge and a transducer, the bridge having channels therein for connecting at least one port of the at least one pipe coupling flanges with the inlet ports of the transducer.

21. A pipe coupling assembly as claimed in claim 20, wherein the transducer is a differential pressure sensor and the bridge has channels that connect at least one port of each pipe coupling flange with a respective port of the transducer.

22. A pipe coupling for process pipe work, wherein the coupling comprises of two bolted pipe flanges, rising stem type valves, an interconnecting bridge, an orifice plate and pipe gaskets or rings, wherein the pipe flanges each comprise a central bore, first and second ports for receiving valves, a take-off channel for linking the first port with the central bore, a feed channel for linking the first port with the second port and wherein the second port links with the exterior of the flange, whereby installation of process media monitoring devices directly on to the process pipe work is allowed.

23. A kit of parts comprising:

one or more a pipe coupling flanges comprising a pipe with a central bore having a flange integrally formed therewith, the flange having first, second and third ports for receiving valves and a plurality of channels, wherein a take-off channel links the first port with the central bore, feed channels link the first port with the second and third ports; and wherein the second and third ports link directly or indirectly with the exterior of the flange; and a bridge having one or more channels therein for connecting at least one port of the at least one pipe coupling flanges with a transducer.

24. A kit of parts as claimed in claim 23 further comprising a transducer.

25. A kit of parts as claimed in claim 23 comprising two pipe coupling flanges, an orifice plate and a transducer, wherein the transducer is a differential pressure sensor.

26. A kit of parts as claimed in any of claims 23, wherein the kit of parts is assembled and tested to industry standards.

* * * * *

UNITED STATES PATENT AND TRADEMARK OFFICE
CERTIFICATE OF CORRECTION

PATENT NO.        : 7,591,192 B2                      Page 1 of 1
APPLICATION NO.   : 10/522489
DATED             : September 22, 2009
INVENTOR(S)       : David Williams It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 771 days.

Signed and Sealed this

Twenty-first Day of September, 2010

David J. Kappos
*Director of the United States Patent and Trademark Office*